US006187898B1

(12) United States Patent
Wagner et al.

(10) Patent No.: US 6,187,898 B1
(45) Date of Patent: Feb. 13, 2001

(54) METHOD FOR CARRYING OUT POLYCONDENSATION REACTIONS

(75) Inventors: Paul Wagner, Düssledorf; Frank Döbert, Köln; Thomas Menzel, Hilden; Torsten Groth, Odenthal; Winfried Joentgen, Köln; Ulrich Liesenfelder, Bergisch Gladbach; Jörgen Weinschenck, Krefeld; Klaus-Peter Heise, Odenthal, all of (DE)

(73) Assignee: Bayer AG, Leverkusen (DE)

( * ) Notice: Under 35 U.S.C. 154(b), the term of this patent shall be extended for 0 days.

(21) Appl. No.: 09/367,457
(22) PCT Filed: Feb. 10, 1998
(86) PCT No.: PCT/EP98/00740
  § 371 Date: Aug. 13, 1999
  § 102(e) Date: Aug. 13, 1999
(87) PCT Pub. No.: WO98/37123
  PCT Pub. Date: Aug. 27, 1998

(30) Foreign Application Priority Data

Feb. 21, 1997 (DE) .............................. 197 06 901

(51) Int. Cl.⁷ .............................. C08G 69/04; C08G 69/10
(52) U.S. Cl. ................... 528/328; 528/342; 528/345; 528/363; 528/367; 525/418; 525/419; 525/420; 525/451
(58) Field of Search ........................ 528/328, 363, 528/342, 345, 367; 525/451, 418, 419, 420

(56) References Cited

U.S. PATENT DOCUMENTS

| 5,219,952 | * | 6/1993 | Koskan et al. | 525/419 |
| 5,221,733 | * | 6/1993 | Koskan et al. | 528/328 |
| 5,367,047 | * | 11/1994 | Wood | 528/363 |
| 5,493,004 | * | 2/1996 | Groth et al. | 528/363 |
| 5,594,077 | * | 1/1997 | Groth et al. | 525/451 |

OTHER PUBLICATIONS

Zimmer AG, High Viscosity Self–Cleaning Reactor, (date unknown). The date of publication is unavailable.
Werner and Pfleiderer, Processing: Linear polyester PET (date unknow). The date of publication is unavailable.

* cited by examiner

Primary Examiner—P. Hampton-Hightower
(74) Attorney, Agent, or Firm—Connolly Bove Lodge & Hutz LLP

(57) ABSTRACT

The invention relates to a method for carrying out polycondensation reactions, according to which the polycondensation of a monomeric starting material is carried out with external supply of heat in a reactor combination which has at least two stages and is composed of a pre-reactor and a high-viscosity reactor, where the low-molecular-weight elimination products produced are removed by evaporation. In the pre-reactor, the reaction product is concentrated to give a high-viscosity preliminary product. The high-viscosity preliminary product is then fed to the high-viscosity reactor, in which it reacts to completion with simultaneous introduction of thermal and mechanical energy and with a residence time of from 20 s to 60 min to give a polycondensation product.

20 Claims, No Drawings

METHOD FOR CARRYING OUT POLYCONDENSATION REACTIONS

BACKGROUND OF THE INVENTION

1. Field of the Invention

A polycondensation reaction is a chemical reaction in which a macromolecule is built up stepwise (Emons, H. H.; Fedtke, M.; Hellmond, P.; Landschulz, G.; Pöschl, R.; Pritzkow, W.; Rätzsch, M.; Zimmermann, G.; Lehrbuch der Technischen Chemie [Textbook of Industrial Chemistry]; VEB Deutscher Verlag für Grundstoffindustrie, Leipzig, 1984). Each step in the condensation produces a reaction product which is in equilibrium with other reaction constituents. The reaction is therefore an equilibrium reaction. In each case the reaction takes place between two different functional groups of the starting materials (monomers), and at each stage of the reaction a low-molecular-weight substance (e.g. water, hydrogen halides, alcohols, etc.) is eliminated, with simultaneous lengthening of a polymer chain by one monomeric building block. Products of the reaction are therefore the macromolecule and the corresponding low-molecular-weight elimination products, in equilibrium with the starting materials.

If a high conversion is desired from a polycondensation reaction the low-molecular-weight elimination products must be removed from the equilibrium in order to shift the reaction equilibrium toward the products. If the monomers are dissolved in a solvent at the beginning of the reaction, there may also be a need for the solvent likewise to be removed from the reaction mixture. It is possible here to use the low-molecular-weight elimination products as a solvent.

When the low-molecular-weight elimination products and the solvent, if used, are removed the viscosity of the reaction mixture can change from a low-viscosity solution (e.g. similar to water) at the beginning of the reaction to give a high-viscosity polymer melt or polymer solution at the end of the reaction. Indeed, it is frequently necessary to remove the low-molecular-weight elimination products and the solvent, if used, through as far as a dry solid if the desired conversion in the reaction is to be achieved.

2. Description of the Related Art

The familiar method for removing the low-molecular-weight elimination products and the solvent, if used, is distillation. This means that while the polycondensation reaction progresses the low-molecular-weight elimination products and, respectively, the solvent, if used, are removed by evaporation, either simultaneously or in stages (alternating reaction and distillation).

Chemical reactors for carrying out polycondensation reactions therefore have two tasks. They must be able to mix and transport the reaction mixture efficiently at low, and also at high, viscosities (where appropriate through as far as dry solids) and at the same time allow removal by evaporation of the low-molecular-weight elimination products and/or also the solvent from the reaction mixture.

The following reactors are used in prior art methods for polycondensation reactions:

Screw Reactors

High-capacity screw reactors of ZDS-R type have been used by OCKER, Werner and Pfleiderer, Stuttgart since as early as 1962 for polycondensing polyesters. The devices are used at low rotation rates and with long residence times (from 1 to 2.5 hours). The process is described in Herrmann: Schneckenmaschinen in der Verfahrenstechnik [Screw Devices in Processing], Springer Verlag 1972. A disadvantage of these devices is their low mixing efficacy, due to the low rotation rates.

Disk Reactors (Zimmer, Frankfurt Am Main)

This type of reactor is a cost-effective alternative to the screw reactor and is nowadays used worldwide for polyester production. The principle on which the reactor is based is that of slowly rotating disks which produce melt films and thin layers which form a large surface for the transfer of material. In the usual embodiment, the disk reactors are not self-cleaning. One version of the reactor which has been equipped with strippers to improve self-cleaning is still being tested on a pilot scale. Like the screw reactor, the reactor can be used over a wide viscosity range. However, its functioning requires that the melt be capable of forming a reservoir. Conversion to a non-flowable paste or to the solid is not possible.

Twin-screw Extruders

Recently, corotating twin-screw extruders with low capacity and high rotation rates have been used for polycondensation. Example: ZSK type from Werner and Pfleiderer, Stuttgart or ZE type from Berstorff, Hanover. GREVENSTEIN, A.: Reaktive Extrusion und Aufbereitung [Reaction Extrusion and Product Treatment], Carl Hanser Verlag 1996, gives polyethylene terephthalate (PET), polybutylene terephthalate (PBT), copolyesters, polyimide (PI) and polyetherimide (PEI) as applications. The efficacy of mixing is good due to the high rotation rates. At the same time there is high shear and dissipation of energy, and this can have an adverse effect on product quality of sensitive polymers. However, the low capacity of the reactor means that this type is of interest only for processes which require a low residence time (generally <1 minute). For this reason industrial use is mostly restricted to postcondensation.

Grid-cage Reactors (e.g. Werner and Pfleiderer)

This type of reactor supplies a large reaction capacity and therefore long residence times, and it is used on an industrial scale for polycondensation reactions. However, compared with the other types it has restrictions with regard to the maximum polymer viscosity which can be processed.

High-capacity Kneading Reactors (e.g. List)

This type approaches the twin-screw extruder in its mixing efficiency and kneading efficiency. However, large capacity means that it is also possible to realize high residence times. Unlike reactor types 1 to 3, however, the axial back mixing and transporting action of these reactors is highly viscosity-dependent, i.e. at low to moderate viscosity back-mixing is at a high level and transporting action is poor. This type of reactor is therefore of relatively little interest industrially for use with low-viscosity media.

BRIEF SUMMARY OF THE INVENTION

It has been found that significantly improved product quality can be achieved in polycondensation reactions if the polycondensation of a monomeric starting material is carried out with external supply of heat in a reactor combination which has at least two stages and is composed of a pre-reactor and a high-viscosity reactor, where the low-molecular-weight elimination products produced are removed by evaporation and the reaction product in the pre-reactor becomes concentrated to give a high-viscosity preliminary product. The viscosity of the highly viscous preliminary product should be greater than 200 mPas, preferably greater than 500 mPas. The high-viscosity preliminary product is then fed to the high-viscosity reactor, in which it reacts to completion with simultaneous introduction of thermal and mechanical energy and with a residence time of from 20 s to 60 min to give a polycondensation product.

The pre-reactor is an apparatus which ensures efficient and intensive heat exchange. Any type of apparatus suitable for heat exchange and having an operating capacity sufficient for carrying out the chemical reaction can be used for this (e.g. a tube-bundle heat exchanger, a falling-film evaporator, a plate heat exchanger, a temperature-controlled static-mixer (TSM) reactor, a mixing vessel with specific stirrer geometry for viscous products, etc.). The pre-reactor may also be a combination of the heat exchangers.

The high-viscosity reactor's heat supply and supply of mechanical energy is sufficient to mix the reaction mixture and set the same in motion, and also to renew the surface of the same, and its reactor capacity is sufficient to ensure that the residence time is achieved, and it also has the ability to process relatively highly viscous materials to dryness. Particular preference is given to the break-up of the resultant solid in this process to give a large number of small particles. This break-up considerably improves the evaporation and, respectively, removal of the substance eliminated during the condensation, and considerably reduces the diffusion path lengths for the substances eliminated. Alongside the more effective removal of the substances eliminated, the large surface of the solid particles markedly improves heat transfer, leading to fully reacted product. The resultant product has a markedly smaller amount of residual monomers and markedly better characteristics in chemical analysis and in use.

Preference is given to the use of a helical-tube evaporator, or another heat exchanger in combination with a helical-tube reactor, as pre-reactor, and a high-capacity kneading reactor in which, using rotating kneading elements and/or shearing elements, the polycondensation product is agitated and comminuted, as high-viscosity reactor.

The starting fluid is, for example, firstly pumped through a heat exchanger with single- or multiphase operation and enters a spiral tube via a pressure-release valve, with some evaporation. As previously stated by CASPER in CIT 42 (1970), No. 6, pp. 349 et seq., turbulent annular flow of the liquid develops in the helical tube and ensures good heat and material transfer, even when the viscosity rises through the reaction. The product, to some extent concentrated via evaporation and precondensed in the helical tube, is fed to the high-capacity kneading reactor. The polycondensation is progressed in the high-capacity kneading reactor, with constant and thorough mixing. During this the viscosity rises further. In specific cases the material becomes a solid which is no longer flowable. Any commercially available kneading reactor may be used for the novel process, as long as it is capable of achieving the abovementioned objectives. Our example uses a CRP type reactor from List AG, Arisdorf, Switzerland. Equipment with reinforced rotors is particularly preferred.

The evaporated low-molecular-weight elimination products and, where appropriate, the solvent may either be drawn off in the pre-reactor, downstream of the pre-reactor, or in the high-viscosity reactor, or discharged with the product from the reactor combination according to the invention.

DETAILED DESCRIPTION OF THE INVENTION

The advantages of the reactor combination according to the invention are described below using the preparation of the sodium salt of polyaspartic acid (Na-PAA) and, respectively, the polysuccinimide (PSI) intermediate.

To prepare polysuccinimide, an aqueous solution of an ammonium salt of maleic acid and/or an aqueous solution of an ammonium salt of maleic acid with low-molecular-weight adducts of an ammonium salt of maleic acid is firstly prepared from the starting materials maleic anhydride (MA) and ammonia ($NH_3$), batchwise or continuously, and then polymerized continuously in the reactor combination according to the invention to give polysuccinimide. During this, polycondensation reactions and intramolecular cyclocondensation reactions, and others, will take place. To achieve a high degree of conversion (or a high molecular weight) in these condensation reactions, both the solvent water and the water of reaction eliminated during the condensation must as far as possible be removed from the reaction mixture.

The monomeric starting material may preferably be obtained by reacting 1,4-butanedicarboxylic acid or 1,4-butenedicarboxylic acid or a derivative thereof with ammonia or with a compound supplying ammonia, e.g. urea, ammonium salts of carbonic acid, ammonium salts of phosphoric acid or formamide.

Other starting materials which may be used in the novel method instead of maleic anhydride are maleic acid, fumaric acid, malic acid, aspartic acid and asparagine, and also mixtures of these. Other cocondensable monomers may also be added to the reaction mixture in the reactor combination according to the invention. Examples of cocondensable compounds which may be used are fatty acids, polybasic carboxylic acids, their anhydrides and amides, polybasic hydroxycarboxylic acids, their anhydrides and amides, polyhydroxycarboxylic acids, aminocarboxylic acids, sugar carboxylic acids, alcohols, polyols, amines, polyamines, aminoalcohols, amino sugars, carbohydrates, ethylenically unsaturated mono- and polycarboxylic acids, protein hydrolysates, e.g. maize protein hydrolysate and soy protein hydrolysate, and aminosulfonic acids. To promote the condensation, condensation auxiliaries may also be added to the reaction mixtures. Examples of these are phosphoric acid, polyphosphoric acid, phosphorous acid, phosphonic acid and acid salts, such as sodium hydrogensulfate, potassium hydrogensulfate and ammonium hydrogensulfate. In a preferred embodiment, these condensation auxiliaries are added to the reaction mixture in the final reaction stage in the high-viscosity reactor.

There is a direct correlation between high conversion and good product quality, i.e. good usage properties acceptable to customers (e.g.: ZnO dispersion test, NACE test).

In one embodiment of the invention, the polymers obtained in the high-viscosity reactor in the second reaction stage can then be subjected to solvolysis, preferably hydrolysis. The resultant polymer preferably has essentially recurring aspartic acid units.

These polymers are used with advantage in aqueous or nonaqueous systems for dispersing inorganic or organic particles, and in particular for inhibiting and dispersing precipitates in water treatment.

EXAMPLES

As a basis for comparison, experiments were firstly carried out according to the prior art with a single reactor.
a) Helical-tube Reactor The reaction mixture must be liquid for processing in a helical-tube reactor. It may be concentrated by evaporation during this to give a viscous melt. When using a helical-tube reactor or pre-reactor, product quality is markedly poorer than with the reactor combination according to the invention (see Examples, $M_W$, ZnO test, NACE test, test description see below). The pre-reactors, such as a helical-tube reactor, are simple and low-cost apparatuses with high throughputs.

b) High-viscosity Reactor

A high-viscosity reactor from List was the sole reactor used. The reaction mixture cannot be concentrated by evaporation to dryness at the throughputs required. A List reactor is not suitable for processing low viscosities. The low-viscosity starting material "flows rapidly through the reactor". The apparatus has high equipment costs per unit. The entire procedure for concentrating the low-viscosity aqueous solution by evaporation to give the solid via the high-viscosity melt/solution is carried out in an apparatus specifically for processing relatively high-viscosity substances. Product quality is markedly poorer than with the reactor combination according to the invention (see Examples, $M_W$, ZnO test, NACE test, test description see below).

c) Novel Process Using a Reactor Combination

The pre-reactor consisted of a helical-tube reactor and the high-viscosity reactor consisted of a List reactor. The novel process with the reactor combination helical-tube/List reactor is the best process when compared with the processes using only one reactor. In the helical-tube reactor the low-viscosity starting-material solution is condensed to give a relatively high-viscosity melt/solution. The relatively high-viscosity melt/solution, which should have a viscosity of more than 200 mPas, preferably more than 500 mPas, is then fed to the downstream List reactor, in such a way that the advantages of the reactor can be fully utilized. The significantly larger reactor capacity permits a relatively high residence time and thus a lower reaction temperature. This results in an efficient and more gentle method of production, and this is seen in the product quality, which is the best achieved (see Examples, $M_W$, ZnO test, NACE test, test description see below).

The reaction and the concentration by evaporation in the pre-reactor is carried out with a residence time of from 0.5 to 300 minutes, preferably from 1 to 20 minutes and particularly preferably from 2 to 10 minutes, at temperatures above 100° C., preferably from 100 to 250° C. and particularly preferably from 110 to 210° C., and at pressures of from 0.01 to 100 bar, preferably from 0.1 to 25 bar and particularly preferably from 1 to 10 bar. In the high-viscosity reactor, temperatures are set at from 100 to 350° C., preferably from 120 to 250° C. and particularly preferably from 140 to 220° C., and pressures at from 0.01 to 10 bar, preferably from 0.1 to 3 bar and particularly preferably from 0.5 to 2 bar, with residence times of preferably from 20 seconds to 60 minutes and particularly preferably from 1 minute to 30 minutes.

The starting-material solution of an ammonium salt of maleic acid may be prepared batchwise or else continuously from water, maleic acid and ammonia, and fed to the reactor combination. The molar ratio of nitrogen in the ammonia to maleic acid here is from 0.1 to 25, preferably from 0.5 to 8 and particularly preferably from 0.9 to 4. The proportion of water in the solution is from 20 to 90% by weight, preferably from 20 to 60% by weight and particularly preferably from 25 to 40% by weight. If the starting-material solution is prepared batchwise, precondensation in which an average of up to 2 molecules combine may occur in the storage tank.

The following usage tests and evaluation methods were used to compare the polycondensation products produced:

Determination of threshold effect (inhibition of calcium carbonate precipitation via substoichiometric addition of inhibitor) by a modified NACE[1]) method:

[1]) NACE: National Association of Corrosion engineers

Solutions Required:
1. 12.15 g of calcium chloride dihydrate analytical grade 68 g of magnesium chloride hexahydrate analytical grade made up to 1000 ml of solution with distilled $CO_2$-free water.
2. 7.36 g of sodium hydrogen carbonate analytical grade made up to 1000 ml of solution with distilled $CO_2$-free water.
3. 1000 mg of the inhibitor substance to be studied made up to 1000 ml of solution with distilled $CO_2$-free water.

Solutions 1. and 2. are to be filtered through a 0.45 µm membrane filter before use and saturated with carbon dioxide. Inhibitor solutions corresponding to the test concentration desired are precharged to 250 ml narrow-neck glass flasks:

| ppm of inhibitor | µL of inhibitor solution |
|---|---|
| 1 | 200 |
| 2 | 400 |
| 3 | 600 |
| 5 | 1000 |
| 10 | 2000 |

Using a 100 ml dispensette, 100 ml of each of solutions 1. and 2. are injected onto the precharged solutions. The flasks are then immediately sealed, shaken once by hand, and placed in a waterbath heated to 70° C. The samples are stored for 16 hours at this temperature. As a comparison a sample is run alongside without addition of inhibitor. (To determine the initial value, calcium content is determined by titration immediately after mixing solutions 1. and 2.)

After this time the samples are removed simultaneously from the waterbath and slowly cooled to a temperature of 30° C. A 5 ml sample of each is then filtered through a 0.45 µm membrane filter into about 100 ml of distilled water and stabilized by acidifying with 0.5 ml of concentrated hydrochloric acid. The determination of calcium content then required is carried out by titration with an indicator.

Percentage inhibition is calculated as follows:

$$\frac{a-b}{c-b} \cdot 100 = \% \text{ inhibition}$$

a: Amount of calcium found in the sample
b: Amount of calcium in the blind sample (after heat-treatment)
c: Amount of calcium in the blind sample (prior to heat-treatment)

Determination of Solid-dispersion Performance Using Zinc Oxide 1 g of the dispersing agent to be studied is dissolved in 50 ml of distilled water. The pH of the sample should be 10. The sample prepared in this way is transferred to a 100 ml measuring cylinder and the volume made up with distilled water (stock solution).

10.0 g of ZnO analytical grade (Merck) is precharged to a 250 ml mixing cylinder and slurried with from 140 to 170 ml of water. The following amounts of dispersing agents are used for this.

| | |
|---|---|
| 50 ppm | 1 ml stock solution |
| 100 ppm | 2 ml stock solution |
| 250 ppm | 5 ml stock solution |
| 500 ppm | 10 ml stock solution |
| 1000 ppm | 20 ml stock solution |
| 1500 ppm | 30 ml stock solution |

The mixture is predispersed using a disperser (e.g. Ultraturrax stirrer) for 30 sec and then made up to 200 ml.

The final sample suspension is shaken three times by hand and stored for 3 hours at room temperature. Using an ordinary 5 ml pipette, an aliquot is then removed at the 150 ml mark and transferred to a 50 ml measuring flask to which 10 ml of 1 N hydrochloric acid and about 20 ml of water have been precharged. After making up the volume in the measuring cylinder, an aliquot of 10 ml is removed and titrated at pH 11 with EDTA solution, with an indicator.
Evaluation $$\frac{V*t*81.37*5}{0.025*100} = \% \text{ ZnO}$$

V=volume of EDTA solution
t=titer of EDTA solution
81.37=molar mass of ZnO
5=50/10 derived from the material taken from the HCl measuring flask
0.025=5/200 derived from the material taken from the cylinder
100=%

Example 1

The conduct of the example described below corresponded to the general method description c) using a reactor combination.
Preparation of Solution of an $NH_4$ Salt of Maleic Acid 51.7 kg of $H_2O$ are precharged at a temperature of 60° C. to a 250 l vessel and 75 kg of solid maleic anhydride are added, giving a maleic acid solution. 16.9 kg of ammonia (gaseous) are then metered in, with cooling, at from 90 to 100° C. The resultant solution of an $NH_4$ salt of maleic acid is temperature-controlled at from 100 to 105° C. and pumped at 41 kg per hour into a polycondensation plant.
Preparation of Polysuccinimide The condensation plant is composed of a pre-heater of length 8.4 m (internal diameter 10 mm) in which the solution is heated to 192° C. at a pressure of 10 bar. From the pre-heater, the solution passes via an orifice into a helical-tube evaporator of length 15 m (internal diameter 15 mm) in which the reaction solution reaches a temperature of 193° C. and a pressure of 2.9 bar downstream of the orifice. The reaction mixture at 195° C. is passed via a pipeline of length 6 m into a List (CRP 12 Konti) kneading apparatus. In the List reactor the reaction mixture is concentrated by evaporation to dryness at temperatures of from 190 to 195° C. and rotation rates of 31/min, and during this is polymerized to completion. An amount of about 21 kg per hour of the resultant granular polysuccinimide is obtained. Its hydrolysis number is 10.61 mmol of NaOH/g of PSI.
Preparation of Solution of an Na Salt of Polyaspartic Acid
2100 g of water and 360 g=9 mol of NaOH are precharged, and 1000 g of polysuccinimide are added little by little at 20° C., with stirring. During this the temperature rises to 60° C. through exothermicity and the PSI dissolves. A further 64.4 g=1.61 mol of NaOH are added, the temperature is increased to 100–110° C. and, with addition of 2×700 g of water, 3×700 g of ammonia-water are distilled off. After adding 175.6 g of water, 3000 g of a 43.7% strength by weight solution of an Na salt of polyaspartic acid are obtained.

| Molecular weight distribution by GPCM$_w$ [g/mol] | ZnO dispersion test 10–300 mg [% of theory] | NACE test 3 ppm/10 ppm [% of theory] |
|---|---|---|
| 2350 | 80 | 78/100 |

Example 2

The example described below was carried out using a single reactor as in the general method description a) (prior art).
Preparation of Solution of an $NH_4$ Salt of Maleic Acid An amount of 40 kg/h of solution of an $NH_4$ salt of maleic acid, temperature-controlled at from 100 to 105° C. and prepared as in Example 1, is pumped into a plant for polycondensation.
Preparation of Solution of an Na/$NH_4$ Salt of Polyaspartic Acid The condensation plant is composed of a pre-heater of length 8.4 m (internal diameter 10 mm) in which the solution is heated to 230° C. at a pressure of 45 bar. From the pre-heater, the solution passes via an orifice into a helical-tube evaporator of length 15 m (internal diameter 15 mm) in which the reaction solution reaches a temperature of 205° C. and a pressure of 7.8 bar downstream of the orifice. The reaction mixture is passed via a pipeline of length 6 m into a vessel. Simultaneously, 40 kg/h of 15% strength aqueous sodium hydroxide are metered into this vessel. The resultant aqueous polyaspartic acid solution has a hydrolysis number of 2.09 mmol of NaOH/g of solution.
Preparation of Solution of an Na Salt of Polyaspartic Acid
3000 g of solution of an Na/$NH_4$ salt of polyaspartic acid are precharged and 501.6 g=6.27 mol of 50% strength NaOH solution are added. The temperature is increased to 100× 110° C. and, with addition of 2×600 g of water, 3×600 g of ammonia-water are distilled off. The residue is 2901.6 g of a 42.8% strength solution of an Na salt of PAA.

| Molecular weight distribution by GPCM$_w$ [g/mol] | ZnO dispersion test 10–300 mg [% of theory] | NACE-test 3 ppm/10 ppm [% of theory] |
|---|---|---|
| 1450 | 64 | 60/79 |

Example 3

The example described below was according to the general method description b) (prior art carried out).
Preparation of Solution of an $NH_4$ Salt of Maleic Acid An amount of 40 kg/h of a solution of an $NH_4$ salt of maleic acid, temperature-controlled at from 100 to 105° C. and prepared as in Example 1, is pumped to a kneading apparatus for polycondensation.
Preparation of the Polycondensate Melt The vessel is connected to the kneading apparatus via a pipeline of length 29.4 m (internal diameter from 10 to 15 mm) which is heated to 100–10° C. In the List (CRP 12 Konti) kneading apparatus the reaction mixture is polymerized at temperatures of from 190 to 195° C. and rotation rates of 31/min. An amount of about 22 kg per hour is obtained of the resultant polycondensate, a high-viscosity melt. It has a hydrolysis number of 10.51 mmol of NaOH/g of melt.
Preparation of Solution of an Na Salt of Polyaspartic Acid
2100 g of water and 360 g=9 mol of NaOH are precharged, and 1000 g of polycondensate melt are added little by little at 20° C., with stirring. During this the temperature rises to 60° C. through exothermicity and the polycondensate dissolves. A further 60.4 g=1.51 mol of NaOH are added, the temperature is increased to 100–110° C., and, with addition of 2×700 g of water, 3×700 g of ammonia-water are distilled off. After adding 175.6 g of water, 3000 g of a 39.1% strength by weight solution of an Na salt of polyaspartic acid are obtained.

| Molecular weight distribution by $GPCM_w$ [g/mol] | ZnO dispersion test 10–300 mg [% of theory] | NACE test 3 ppm/10 ppm [% of theory] |
|---|---|---|
| 1450 | 34 | 42/69 |

What is claimed is:

1. Method for performing polycondensation reactions to form a polycondensation product, wherein, in a first reaction step, a monomeric starting material is produced by an exothermic reaction and the temperature of the monomeric starting material is controlled via cooling before said monomeric starting material is used in a second reaction step in which the polycondensation of the monomeric starting material is performed with external supply of heat in a reactor combination which has at least two stages and is composed of a pre-reactor and a high-viscosity reactor, where low-molecular-weight elimination products produced are removed by evaporation, further wherein reaction product becomes concentrated in the pre-reactor to give a high-viscosity preliminary product and the preliminary product reacts to completion in the high-viscosity reactor with supply of thermal and mechanical energy and with a residence time of from 20 s to 60 min in the high-viscosity reactor to give the polycondensation product.

2. Method according to claim 1, wherein the monomeric starting material is obtained by reacting maleic acid, fumaric acid, malic acid, aspartic acid, maleic anhydride or mixtures thereof with ammonia or with a compound supplying ammonia.

3. Method according to claim 1, wherein an aqueous solution of an ammonium salt of maleic acid is used as the monomeric starting material and polysuccinimide (PSI) is the polycondensation product.

4. Method according to claim 1, wherein the reaction in the pre-reactor is performed at a pressure of from 0.01 bar to 100 bar, at temperatures above 100° C. and with a residence time of from 0.5 min to 300 min, and the reaction in the high-viscosity reactor is performed at a temperature of from 100° C. to 300° C. and at a pressure of from 0.01 bar to 10 bar.

5. Method according to claim 4, wherein the reaction in the pre-reactor is performed at temperatures of from 100° C. to 250° C., at a pressure of from 0.1 bar to 25 bar, and with a residence time of from 1 min to 20 min, and the reaction in the high-viscosity reactor is performed at temperatures of from 120° C. to 250° C., at a pressure of from 0.1 bar to 3 bar, and with a residence time of from 20 s to 60 min.

6. Method according to claim 3, wherein an aqueous solution of an ammonium salt of maleic acid with a molar ratio of nitrogen in the ammonium salt to the maleic acid of from 0.1 to 25, is used as the monomeric starting material, further wherein the proportion of water is from 20 to 90% by weight.

7. Method according to claim 3, wherein the aqueous solution of an ammonium salt of maleic acid is fed to a pre-reactor constructed in the form of a helical tube and the polycondensation product in the high-viscosity reactor is agitated and comminuted by rotating kneading elements and/or shearing elements.

8. Method according to claim 7, wherein the polycondensation product in the high-viscosity reactor is concentrated to give free-flowing solid particles.

9. Method according to claim 1, wherein the polycondensation product obtained in the second reaction step is subjected to solvolysis.

10. Method according to claim 1, wherein the polycondensation product has recurring aspartic acid units.

11. A method of using the polycondensation product obtained by the method of claim 1, wherein said polycondensation product is added to aqueous or nonaqueous systems containing inorganic or organic particles to disperse said inorganic or organic particles.

12. Method for performing polycondensation reactions to form a polycondensation product, wherein, in a first reaction step, a monomeric starting material is produced by an exothermic reaction and the temperature of the monomeric starting material is controlled via cooling before said monomeric starting material is used in a second reaction step in which the polycondensation of the monomeric starting material is performed with external supply of heat in a reactor combination which has at least two stages and is composed of a pre-reactor and a high-viscosity reactor, further wherein reaction product becomes concentrated in the pre-reactor to give a high-viscosity preliminary product and the preliminary product reacts to completion in the high-viscosity reactor with supply of thermal and mechanical energy and with a residence time of from 20 s to 60 min in the high-viscosity reactor to give the polycondensation product which is discharged from the high-viscosity reactor along with low-molecular-weight elimination products produced in the pre-reactor and the high-viscosity reactor.

13. Method according to claim 1, wherein the monomeric starting material is produced in the first reaction step in the presence of a solvent.

14. Method according to claim 13, wherein at least a portion of said solvent is removed in the pre-reactor by evaporation.

15. Method according to claim 13, wherein said solvent is water.

16. Method according to claim 1, wherein the temperature of the monomeric starting material in the first reaction step is controlled so as to be from 100 to 105° C. before said monomeric starting material is used in the second reaction step.

17. Method according to claim 9, wherein the polycondensation product obtained in the high-viscosity reactor is subjected to hydrolysis to form a hydrolyzed polycondensation product.

18. Method according to claim 1, wherein the hydrolyzed polycondensation product has recurring aspartic acid units.

19. Method according to claim 1, wherein the viscosity of the high-viscosity preliminary product is greater than 200 mPas.

20. Method according to claim 1, wherein the viscosity of the high-viscosity preliminary product is greater than 500 mPas.

* * * * *